US010484247B2

United States Patent
Bergström et al.

(10) Patent No.: US 10,484,247 B2
(45) Date of Patent: Nov. 19, 2019

(54) TRANSMISSION CONTROL OF A MULTI-HOP RELAY RADIO

(71) Applicant: Telefonaktiebolaget LM Ericsson (publ), Stockholm (SE)

(72) Inventors: Andreas Bergström, Linköping (SE); Joel Berglund, Linköping (SE); Rui Fan, Beijing (CN); Martin Hessler, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 18 days.

(21) Appl. No.: 15/577,537

(22) PCT Filed: May 29, 2015

(86) PCT No.: PCT/EP2015/062016
§ 371 (c)(1),
(2) Date: Nov. 28, 2017

(87) PCT Pub. No.: WO2016/192761
PCT Pub. Date: Dec. 8, 2016

(65) Prior Publication Data
US 2018/0152353 A1    May 31, 2018

(51) Int. Cl.
*H04L 12/24* (2006.01)
*H04W 40/12* (2009.01)
(Continued)

(52) U.S. Cl.
CPC ............ *H04L 41/12* (2013.01); *H04L 1/1896* (2013.01); *H04L 45/121* (2013.01);
(Continued)

(58) Field of Classification Search
CPC ..... H04L 1/1896; H04L 41/12; H04L 45/121; H04L 45/123; H04L 45/24; H04W 40/12; H04W 84/047; H04W 84/18
See application file for complete search history.

(56) References Cited

U.S. PATENT DOCUMENTS 7,389,462 B1 *  6/2008  Wang ..................... H04L 1/188
                                                   714/748
2003/0115321 A1 *  6/2003  Edmison .................. H04L 1/20
                                                   709/224
(Continued)

FOREIGN PATENT DOCUMENTS

EP    1450521 A2    8/2004
EP    2117170 A1   11/2009
(Continued)

OTHER PUBLICATIONS

International Search Report and Written Opinion of the International Searching Authority, PCT/US2015/062016, dated Sep. 14, 2015, 11 pages.
(Continued)

*Primary Examiner* — Kan Yuen
(74) *Attorney, Agent, or Firm* — Patent Portfolio Builders, PLLC

(57) ABSTRACT

The setting of a value of the transmission control parameter for a transmission of data on a multi-hop relay radio link of a cellular network is controlled. Said controlling is based on a route time of a packet transmitted between end nodes of the multi-hop relay radio link. E.g., the transmission control parameter may relate to a property of an Automatic Repeat Request protocol.

16 Claims, 9 Drawing Sheets

(51) Int. Cl.
*H04L 1/18* (2006.01)
*H04L 12/727* (2013.01)
*H04L 12/721* (2013.01)
*H04L 12/707* (2013.01)
*H04W 84/04* (2009.01)
*H04W 84/18* (2009.01)

(52) U.S. Cl.
CPC ............ *H04L 45/123* (2013.01); *H04L 45/24* (2013.01); *H04W 40/12* (2013.01); *H04W 84/047* (2013.01); *H04W 84/18* (2013.01)

(56) References Cited

U.S. PATENT DOCUMENTS

| | | | | |
|---|---|---|---|---|
| 2004/0165543 | A1* | 8/2004 | Nakazawa | H04L 47/10 370/252 |
| 2010/0135221 | A1* | 6/2010 | Komura | H04L 1/1607 370/329 |
| 2011/0179329 | A1 | 7/2011 | Kim et al. | |
| 2011/0286449 | A1* | 11/2011 | Ichino | H04L 1/1874 370/389 |
| 2012/0266038 | A1* | 10/2012 | Ou | H04L 1/1896 714/748 |
| 2014/0126406 | A1* | 5/2014 | Ibanez | H04L 41/5025 370/252 |
| 2015/0049664 | A1* | 2/2015 | Gora | H04W 84/047 370/315 |

FOREIGN PATENT DOCUMENTS

| | | |
|---|---|---|
| EP | 2600165 B1 | 7/2014 |
| WO | WO 2006/104341 A2 | 10/2006 |
| WO | WO 2010/060108 A2 | 5/2010 |

OTHER PUBLICATIONS

3GPP TS 36.322, V12.1.1 (Dec. 2014) Technical Specification Group Radio Access Network; Evolved Universal Terrestrial Radio Access (E-UTRA); Radio Link Control (RLC) protocol specification (Release 12), 40 pages.

3GPP TS 36.322, V12.2.0 (Mar. 2015) Technical Specification Group Radio Access Network; Evolved Universal Terrestrial Radio Access (E-UTRA); Radio Link Control (RLC) protocol specification (Release 12), 40 pages.

Wiemann, H., et al., "A Novel Multi-Hop ARQ Concept," Proceedings of the 61$^{st}$ IEEE Vehicular Technology Conference, 2005 (VTC 2005-Spring) May 30-Jun. 1, 2005, Stockholm, SE, 5 pages.

* cited by examiner

TRANSMISSION CONTROL OF A MULTI-HOP RELAY RADIO

CROSS REFERENCE TO RELATED APPLICATIONS

This application is a 35 U.S.C. § 371 national stage application of PCT International Application No. PCT/EP2015/062016 filed on May 29, 2015, the disclosure and content of which is incorporated by reference herein its entirety.

TECHNICAL FIELD

Various embodiments of the invention relate to controlling the setting of a value of a transmission control parameter for a transmission of data on a multi-hop relay radio link of a cellular network. In particular, various embodiments relate to techniques of considering a route time of a packet transmitted between end nodes of the multi-hop relay radio link when controlling said setting of the value of the transmission control parameter.

BACKGROUND

Typically, a multi-hop relay radio link of a cellular network comprises a plurality of links between neighboring nodes and may extend between respective end nodes, namely a source node and a target node. Here, transmission of the data is achieved by employing multiple hops along relay nodes or forwarding nodes (abbreviated for simplicity as relays) arranged in between the end nodes of the multi-hop relay radio link. Communication with the relays may be radio communication. The data may be packetized using a suitable protocol; this provides packetized data for transmission on the multi-hop relay radio link.

Sometimes, configuration of one or more transmission control parameters for the transmission of the data on the multi-hop relay radio link may be desired. However, it is expected that the transmission control parameters vary from link to link. Because of this, setting of the transmission control parameter by an end node of the multi-hop relay radio link can be difficult: Typically the characteristics of all relays in between the end nodes need to be taken into account.

Additionally, it is possible that a topology of the network changes dynamically when nodes are added and/or removed and where dynamic routing of the data along different route paths is employed. Such a dynamic changing of the topology of the network proves it difficult to take into account the characteristics of all relays and links of the multi-hop relay radio link.

SUMMARY

Therefore, a need exists for advanced techniques of controlling the setting of a transmission control parameter for a transmission on a multi-hop relay radio link.

This need is met by the features of the independent claims. The dependent claims define embodiments.

According to a first aspect, a device is provided. The device comprises at least one processor. The at least one processor is configured to control setting of a value of a transmission control parameter for a transmission of data on a multi-hop relay radio link of a cellular network. Said controlling is based on a route time of a packet transmitted between end nodes of the multi-hop relay radio link.

According to a second aspect, a method is provided. The method comprises controlling a setting of a value of a transmission control parameter for a transmission of data on a multi-hop relay radio link of a cellular network. Said controlling is based on a route time of a packet transmitted between end nodes of the multi-hop relay radio link.

According to a third aspect, a computer program product comprising program code is provided. Execution of the program code by a processor causes the processor to execute a method comprising: controlling a setting of a value of a transmission control parameter for a transmission of data on a multi-hop relay radio link of the cellular network. Said controlling is based on a route time of a packet transmitted between end nodes of the multi-hop relay radio link.

It is to be understood that the features mentioned above and features yet to be explained below can be used not only in the respective combinations indicated, but also in other combinations or in isolation, without departing from the scope of the present invention.

Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION OF EMBODIMENTS

Figure 1:
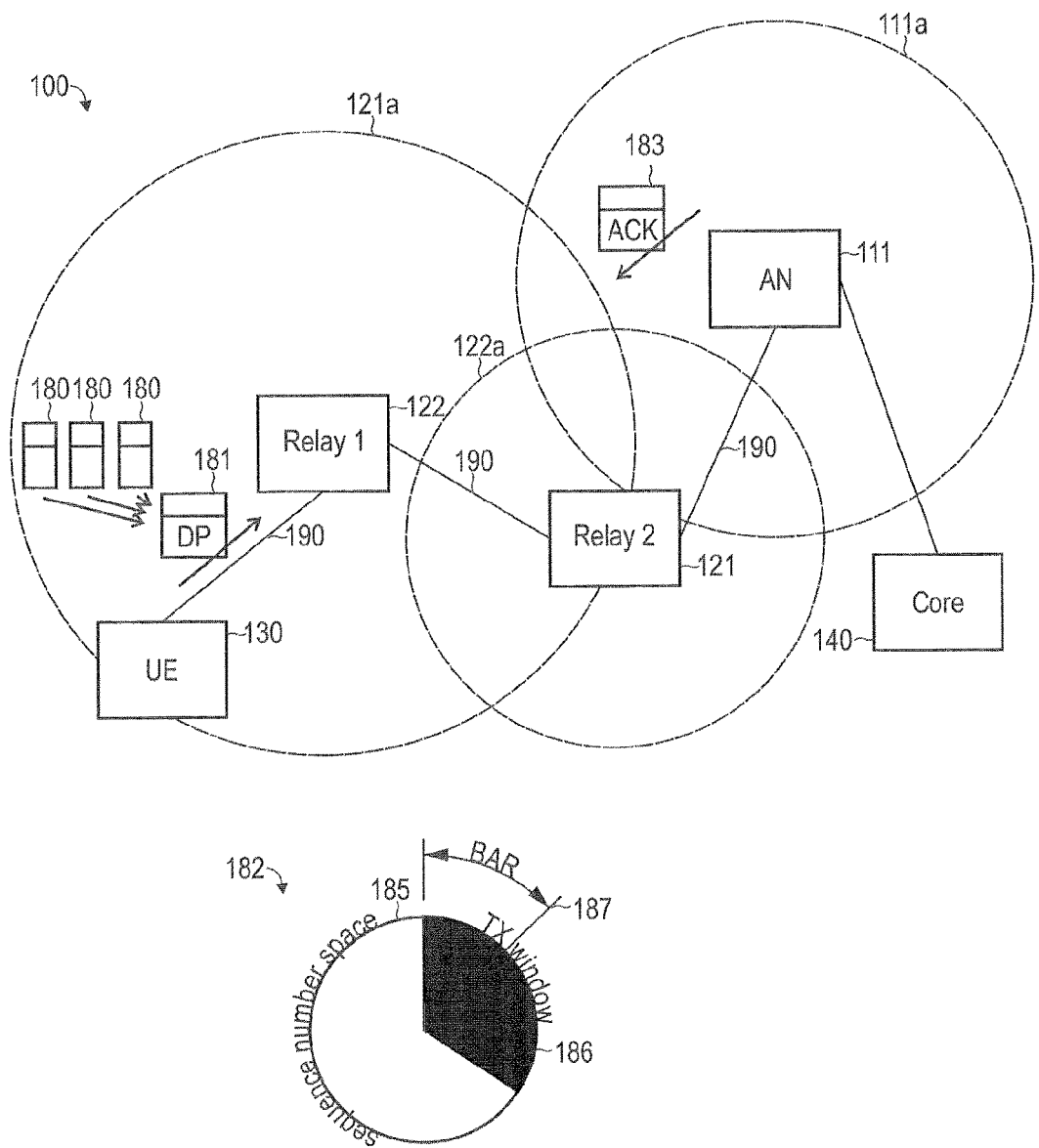
FIG. 1 schematically illustrates transmission of data on a multi-hop relay radio link of a cellular network, said transmission implementing an Automatic Repeat Request protocol to protect the transmission of the data.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a radio connection. Functional blocks may be implemented in hardware, firmware, software, or a combination thereof.

Hereinafter, techniques are explained which enable to control the setting of a value of one or more transmission control parameters of a multi-hop relay radio link of a cellular network. In particular, techniques are explained which enable the setting of the value of the one or more transmission control parameters based on a route time of a packet of data transmitted on the multi-hop relay radio link. By taking into consideration the route time of the packet along the multi-hop relay radio link, it becomes possible to accurately set the value of the transmission control parameter. The controlling of the setting of the value of the one or more transmission control parameters can be executed by a communication device (UE), an access node, a relay, and/or a network node of the core network of the cellular network.

When controlling the setting the value of the one or more transmission control parameters, a configuration and/or a property of relays arranged in between end nodes of the multi-hop relay radio link can be taken into account. This allows to set the value of the transmission control parameter such that properties of the topology of the cellular network and in particular of the multi-hop relay radio link are appropriately taken into account. E.g., a load level, a processing time, a capacity, etc. of one or more relays of the multi-hop relay radio link can be taken into account. It is possible that such properties are reflected in the route time of the packet.

In FIG. 1, a cellular network 100 comprising a multi-hop relay radio link 190 is schematically illustrated. The multi-hop relay radio link 190 comprises two end nodes 111, 130 and two relays 121, 122, all connected via four radio links. The end nodes are a UE 130 acting as a source node and an access node 111 acting as a target node; i.e., FIG. 1 illustrates a scenario of uplink (UL) transmission. To this end, the UE 130 may implement a send buffer and the access node 111 may implement a receive buffer. Alternatively or in addition, the access node 111 may act as the source node and the UE 130 may act as the target node, thereby enabling a downlink (DL) transmission. In this case, the UE 130 may implement a receive buffer and the access node 111 may implement a send buffer. Assuming a communication between the UE 130 and a peer end via a core network (CN) 140, the relays 121, 122 may send data traffic towards the CN 140 of the cellular network 100 and employ a radio link to the access node 111 for this. Likewise, the relays 121, 122 are capable of forwarding data traffic from the CN 140 towards the UE 130. Thus, generally speaking, techniques as described herein may be employed for UL and/or DL transmission of data. A section of the multi-hop relay radio link 190 between the relays 121, 122 and the access node 111 may be referred to as a wireless backhaul. Here, the wireless backhaul section of the multi-hop relay radio link 190 and the section of the multi-hop relay radio link 190 between the UE 130 and the direct communication peer relay 122 (radio access link) may employ the same or different radio frequencies, thereby enabling in-band or out-of-band relaying At the source node 111, data may be packetized using a suitable protocol. E.g. higher-layer data 180 is received from a higher protocol layer in the source node 130 and packetized by means of concatenation and/or segmentation at a particular protocol layer at the source node 130 which are below the higher protocol layers; the higher-layer data 180 may comprise control data and/or payload data. For illustrative purposes, in FIG. 1 a data packet 181 is shown which is sent from the UE 130 towards the CN 140 via the multi-hop relay radio link 190. The access node 111 acknowledges successful reception of the data packet 181 by sending a positive acknowledgement (ACK) 183. Alternatively, the access node 111 may acknowledge unsuccessful receipt of the data packet 180 by sending a negative acknowledgement (NACK). Sending of the ACK 183 and/or NACK is part of an Automatic Repeat Request (ARQ) protocol 182 employed to protect the transmission of the higher-layer data 180 against transmission losses. The ARQ protocol 182 may be part of a Radio Link Control (RLC) protocol.

The techniques described hereinafter relate to controlling of a setting of a value of a transmission control parameter for executing sending and/or receiving of data on the multi-hop relay radio link 190 of the cellular network 100. In this respect, sending data and/or receiving data may be referred to as performing a transmission. This controlling is based on a route time of a packet transmitted between the end nodes 111, 130 of the multi-hop relay radio link 190.

The route time may correspond to a time that the packet is on-the-fly in between the end nodes 111, 130. For illustrative purposes, it is primarily assumed hereinafter that the packet whose route time is considered corresponds to the data packet 181 which, e.g., also carries the higher-layer data 180 etc. However, it is also possible that the route time of a probing packet or of a control-signaling packet is determined. E.g., the transmission of the data packet 181 may employ a payload channel of the multi-hop relay radio link 190. E.g., the transmission of the control-signaling packet may employ a control channel of the multi-hop relay radio link 190.

The route time may correspond to a unidirectional end-to-end route time from the source node to the target node of the end nodes 111, 130 of the multi-hop relay radio link 190; in this respect, the route time may correspond to an aggregate route time which may be comprised of hop times of each respective hop in-between neighboring nodes along the route path from the source node 130 to the target node 111. The route time may be derived directly, e.g., by summing up hop times in-between the neighboring nodes along the multi-hop relay radio link. It is also conceivable that the route time is derived from a bidirectional round trip time which may correspond to a route path from the source node 130 to the target node 111 and back to the source node 130. The round trip time may then correspond to the double route time.

The cellular network 100 may be employed in various use cases and/or may implement various radio access technologies. One example of the cellular network 100 is the small-cell dense-urban heterogeneous outdoor deployment scenario. Here, a micro base station, corresponding to the access node 111, can be located above street level, e.g., on a rooftop. Pico base stations, e.g. corresponding to the relays 121, 122 of FIG. 1, can be located on street level, e.g., on building walls or lamp posts.

Different radio access technologies are conceivable, e.g., the Third Generation Partnership Program (3GPP) Long-Term Evolution (LTE) radio access technology, the 3GPP High-Speed Packet Data Access (HSPA) radio access technology, the 3GPP Global System for Mobile Communications (GSM) radio access technology, or the Institute of Electrical and Electronics Engineers (IEEE) 802.11x Wi-Fi protocols, etc.

Hereinafter, for illustrative purposes, reference will be primarily made to the 3GPP LTE radio access technology; however, similar techniques as described herein may be readily applied to different kinds and types of radio access technologies.

Transmission of data along the multi-hop relay radio link 190 can be controlled by the L2, L2', and L2 Relay interfaces, see "A novel multi-hop ARQ concept", H. Wiemann et al., 61st IEEE Vehicular Technology Conference (2005). The L2, L2', and L2 Relay interfaces may employ the RLC protocol according to 3GPP Technical Specification (TS) 36.322, V12.2.0 of Mar. 23, 2015, thereby implementing an ARQ protocol.

Various kinds and types of transmission control parameters may be subject to the techniques discussed herein. Below, examples of transmission control parameters the values of which may be set based on the route time are given. The values of all or some of the below-mentioned transmission control parameters may be set based on the route time.

Transmission Control of Packetization: One or more properties of packetizing higher-layer packets by the source node can be set based on the route time. The packetizing of higher-layer packets includes various properties some of which are explained hereinafter.

Internet protocol (IP) packets which may be header-compressed at a preset compression rate—which may be a transmission control parameter the value of which is set based on the route time—may be segmented and/or concatenated. The IP packets, e.g., in the context of the RLC protocol, may be referred to as service data units (SDUs) and may represent an example of the higher-layer packets. The data units after packetization may be referred to as protocol data units (PDUs).

Packetization generates PDUs of a preset size or size range—which may be a transmission control parameter the value of which is set based on the route time—for transmission over the multi-hop relay radio link 190.

Over the course of retransmission attempts of a given PDU, the corresponding higher-layer data may be re-packetized, i.e., concatenation and/or segmentation may be executed a plurality of times for a given SDU; preset re-packetization transmission control parameters may be employed such as trigger criterions for executing re-packetization—which may be a transmission control parameter the value of which is set based on the route time.

Transmission Control of Retransmission: One or more properties of an ARQ protocol employed by the end nodes 111, 130 can be set based on the route time. Some properties of the ARQ protocol are explained hereinafter.

The ARQ protocol handles retransmission of PDUs subject to a transmission error. The retransmission of PDUs subject to the transmission error is triggered by a timeout of a preset retransmission timer—which may be a transmission control parameter the value of which is set based on the route time.

The number of retransmission attempts may be limited by a timeout timer and/or by a retransmission counter having preset values—which may be transmission control parameters the values of which are set based on the route time: Hence, the maximum number of retransmission attempts of a given data packet of the data may be set based on the route time. A specific example is the RLC protocol parameter "maxRetxThreshold": This transmission control parameter is used by the source node to limit the number of retransmissions of a PDU. Hence, this transmission control parameter can correspond to a maximum number of retransmission attempts of a given data packet 181. E.g., if the maximum number of retransmission attempts is reached, the given data packet may be considered outdated and be discarded. Further retransmission attempts may be aborted.

Gaps in the sequence number space in a receive buffer may exist and be skipped.

A transmission error may be identified by not receiving a positive ACK and/or by receiving a NACK of the corresponding packet according to an employed acknowledgement scheme of the ARQ protocol—which may be a transmission control parameter the value of which is set based on the route time. In the framework of the RLC protocol, the ACKs and/or NACKs are sometimes referred to as status reports or status PDUs. E.g., ACKs may be retransmitted from time to time depending on a timeout duration—which may be a transmission control parameter the value of which is set based on the route time. Hence, a timeout duration for retransmitting the status message may be set based on the route time.

Status reports 187 that positively and/or negatively acknowledge a plurality of data packets 181 may be employed, e.g., if block acknowledgement is enabled according to a preset parameter—which may be a transmission control parameter the value of which is set based on the route time. A number of the plurality of data packets 181 acknowledged by the status reports 187 may be variable, e.g., in the context of the IEEE 802.11x Wi-Fi protocols—which may be a transmission control parameter the value of which is set based on the route time. Hence, in the context of the IEEE 802.11 Wi-Fi protocol, depending on the value of this transmission control parameter, the block acknowledgment status report 187 may acknowledge a larger or a smaller number of PDUs Status reports may be polled for or may be sent by the target end node out of its own motion or pro-actively according to a preset transmission control parameter—which may be a transmission control parameter the value of which is set based on the route time. A corresponding poll for a status report may be referred to as status report request. Hence, a property of the status report request may be set based on the route time. A first specific example is the RLC protocol parameter "pollPDU": This transmission control parameter is used by the source node to trigger a poll for a status report every pollPDU PDUs transmitted. E.g., this transmission control parameter may trigger a request for an a status report 187. A second specific example is the RLC protocol transmission control parameter "pollByte": This transmission control parameter is used by the source node to trigger a poll for a status report every pollByte bytes transmitted. E.g., this transmission control parameter may trigger a request for an status report 187.

E.g., a timeout timer for re-polling a status report may be employed having a given timer value—which may be a transmission control parameter the value of which is set based on the route time. Hence, a value of a timeout duration for transmitting the acknowledgement request may be set based on the route time. A first specific example is the RLC protocol transmission control parameter "t-PollRetransmit": This timer is used by the source node to retransmit a poll for a status report in a controlled fashion. If, in response to sending a poll, no status report 187 is received for the corresponding time duration, it is possible to assume that the poll has been lost. Then, once the timer has elapsed, it is possible to retransmit the poll. A second specific example is the RLC protocol transmission control parameter "t-Status-Prohibit": This timer is used by the target node in order to prohibit transmission of a status report including one or more ACKs. This timer controls after which time the target node 111, 130 assumes that a status report is lost during transmission. This timer can be said to duplicate some of the functionality of the 't-PollRetransmit' timer on target node-side.

Typically, data 181 may be sent and/or received out-of-order as long as the corresponding sequence numbers reside within a transmission window 186 of preset size—which may be a transmission control parameter the value of which is set based on the route time. Hence, the size of the transmission window 186 may be set based on the route time.

A sequence number space 185 of preset size—which may be a transmission control parameter the value of which is set based on the route time—defines a bit length of a corresponding sequence number field in the header of the PDU; ambiguities due to wrap-arounds of the sequence numbers should be avoided. Hence, a size of the sequence number space 185 may be set based on the route time. A specific example is the RLC protocol transmission control parameter "sn-FieldLength": This parameter gives the size of the sequence number space 185. Depending on the value of this transmission control parameter, more or fewer bits in the header of a given data packet 181 may be reserved for indicating a sequence number of the given packet.

The ARQ protocol 182 may be supplemented by error-correction techniques such as forward error correction. Error-correction techniques typically rely on a check sum of preset size—which may be a transmission control parameter the value of which is set based on the route time—and one or more preset protection algorithms—which may be a transmission control parameter the value of which is set based on the route time.

Such transmission control parameters as mentioned above may be employed in the framework of the RLC protocol. Here, it is possible that the corresponding parameters are configured on a per-link basis, e.g., independently for each node 111, 121, 122, 130 of the multi-hop relay radio link 190. Differently, where the RLC Relay ARQ protocol is employed, RLC entities in each relay 121, 122 do not terminate each link between neighboring nodes 111, 121, 122, 130 along the multi-hop relay radio link 190—which would cause a cascade of isolated hops. Instead, the same value of the sequence number space 185, the same value of the PDU size, the same value of the protocol states, the same value of the transmission window 186, and/or the same status reports are reused for all nodes 111, 121, 122, 130 along the multi-hop relay radio link 190. Thus, status reports may be reused and exchanged between neighboring links along the multi-hop relay radio link 190.

According to the RLC Relay ARQ protocol, a temporary responsibility for the retransmission of a given data packet 181 may be delegated from the source node onwards along the nodes 111, 121, 122, 123 of the multi-hop relay radio link 190 in a stepwise manner along the multi-hop relay radio link 190. In such a scenario, the ultimate retransmission responsibility may nonetheless remain in the source node. By such techniques, two effects may be achieved: First, retransmissions can be typically limited to the link of the multi-hop relay radio link 190 where the transmission error occurred. Second, the source node having ultimatum retransmission responsibility acts as an outer loop ARQ protocol as it provides a fallback state for error recovery. I.e., a layered concept can be avoided.

Transmission Control of Send Buffer and Receive Buffer: One or more properties of a receive buffer of the target node 111 can be set based on the route time.

Some properties are explained hereinafter.

Duplicated data packets PDUs 181 may be removed from the receive buffer, e.g., after a given time period—which may be a transmission control parameter the value of which is set based on the route time. PDUs may be duplicated, e.g., due to multiple successful transmission attempts.

In-sequence delivery of SDUs to upper protocol layers may be supported, e.g., by implementing the receive buffer as a so-called receive reordering buffer which forwards the received data packets 181 to higher protocol layer(s) in sequence. E.g., if a gap in the sequence numbers of received data packets 181 exists, e.g., due to a transmission error, depending on the position of the transmission window 186, out of sequence delivery of SDUs to upper protocol layers is possible. Hence, a value of a timeout duration for reordering sequence numbers of received data packets may be set based on the route time. A specific example is the RLC protocol transmission control parameter "t-Reordering": This timer is used by the target node and source node in order to detect loss of PDUs at lower layers. E.g., if upon a lapsing of this timer, a corresponding gap exists in a send buffer and/or a receive buffer, it can be assumed that the corresponding PDU has not been transmitted successfully. Then, receive reordering can be executed to skip a corresponding gap of sequence numbers is the receive buffer. The corresponding PDU can be discarded.

Transmission Control of Route Path: One or more properties of a route path between the end nodes can be set based on the route time. Some properties are explained hereinafter.

There are different transmission control parameters conceivable that specify a route path. E.g., the route path may be specified in terms of a particular sequence of relays 121, 122 employed for forwarding a data packet 181 towards the target node.

The route path may be specified in terms of a transmission control parameter the value of which specifies a sequence of relays 121, 122—which may be a transmission control parameter the value of which is set based on the route time. Alternatively or additionally, the route path may be specified in terms of routing rules or routing tables configured for each relay 121, 122—which may be a transmission control parameter the value of which is set based on the route time. E.g. the value to be set may correspond to an index identifying the sequence of the relays 121, 122 or the route path, respectively.

As can be seen from the above, various transmission control parameters exist that can be controlled depending on properties of the multi-hop relay radio link. According to illustrated concepts, one or more values of such transmission control parameters are set based on a route time of the data packet 181 (cf. FIG. 1) transmitted between end nodes 111, 130 of the multi-hop relay radio link. By such means, automated and quantitative setting of the values of transmission control parameters, e.g., of transmission control parameters of an ARQ protocol 182 and/or RLC transmission control parameters becomes possible. Incorrect setting of the values of transmission control parameters can be avoided, thereby increasing and overall performance of the transmission of the higher-layer data 180 along the multi-hop relay radio link 190. E.g., excessive delays and/or unnecessary retransmissions can be avoided.

Hereinafter, various examples of the quantitative dependency of the setting of the value of the one or more transmission control parameters are given for illustrative purposes.

One example is given for the timeout duration for retransmitting the acknowledgement request, and in particular the timer "t-PollRetransmit" as mentioned above. The value of this timer determines the time period after which another poll for a status report is added to the header of a next transmitted packet if no status report is received in response to a previous poll. This could also render a retransmission in case no new data was available. If the value of this timer is set much lower that the route time, then an excessive amount of polls and possibly also retransmissions is sent—even though the previous polled data packet or resulting status message may still be in-flight on the multi-hop relay radio link 190 rather than lost. If set to a value too high on the other hand, then an unnecessary long waiting time/delay results before the transmission of the next poll, in case no status report was received. As can be seen, the setting of the value of this timer is preferably correlated with the route time of the data packet 181, e.g. in a directly proportional way.

A similar argumentation can be done for the timeout duration for reordering sequence numbers of received data packets, and in particular the timer "t-Reordering": the value of this timer controls the duration after which the target node 111, 130 shall assume that packets not received—e.g., corresponding to gaps in the sequence numbers of data packets in the receive buffer in case later transmitted data packets are received out-of-sequence—are lost by lower layers rather than still in-flight on the multi-hop relay radio link 190.

A further example is given for the timeout duration for retransmitting the status report, in particular the timer "t-StatusProhibit". The value of this timer controls the duration after which the target node 111, 130 assumes a status report lost rather than in-flight during transmission along the multi-hop relay radio link 190. This timer is particularly important when receiving multiple frequent polls for status reports by the source node 111, 130. If the value of this timer is set too high, this results in status reports not being sent even though the last status report was lost. If the value of this timer is set too low, the target node 111, 130 responds to too many polls. The value of this timer preferably should also be increased or decreased in direct proportion to the estimated route time.

Thus, the values of all these timers should preferably be increased or decreased in direct proportion to the estimated route time.

For other transmission control parameters, e.g., other transmission control parameters of the RLC protocol, appropriate setting may be more complex if compared to the setting of the values of the transmission control parameters corresponding to the timers as described above. E.g., in some scenarios, the determining of a value of the transmission control parameter may be indirect as further parameters beyond the route time may be taken into account in the setting. E.g., in addition to the route time, the expected total potential amount of outstanding/in-flight data may be considered; this may be dependent on the bandwidth.

Next, techniques will be discussed at greater detail which enable determining the route time usable for the control of the setting of the value of the transmission control parameter.

In a simple embodiment, it is possible to assume a homogeneous delay characteristic for each hop and relay 121, 122 along the multi-hop relay radio link 190. In such a scenario, the route time scales linearly with the number of relays 121, 122. In such a scenario, it is possible to determine the route time from a general knowledge of the topology of the cellular network 100; e.g., if it is known how many relays 121, 122 are part of the cellular network 100, this information can be taken in order to determine the route time. RRC control signaling can be employed to determine the number of hops. Based on one or more hop times associated with the hops, the route time may be determined.

In further embodiment, it is possible that the route time is indicated by a control message received by the corresponding node. Then, there is no necessity to provide dedicated logic that enables to determine the route time.

In still further embodiments, it is possible to determine the route time based on timing information included in the data packet 181. The timing information may be indicative of a time required to forward the data packet 181 along the route path extending between the end nodes 111, 130 of the multi-hop relay radio link 190. This indication of the time required can be in given various metrics.

Generally, the timing information can correspond to a counter or a timestamp, etc. The particular implementation of the timing information may correspond amongst others upon the framework of requirements imposed by the architecture of the cellular network 100. By relying on the timing information included in the data packet 181, it becomes possible to more accurately determine the route time in complex topologies of the cellular network 100. In particular, it becomes possible to also take into account scenarios where the route time does not scale linearly with the number of relays 121, 122.

Figure 2:
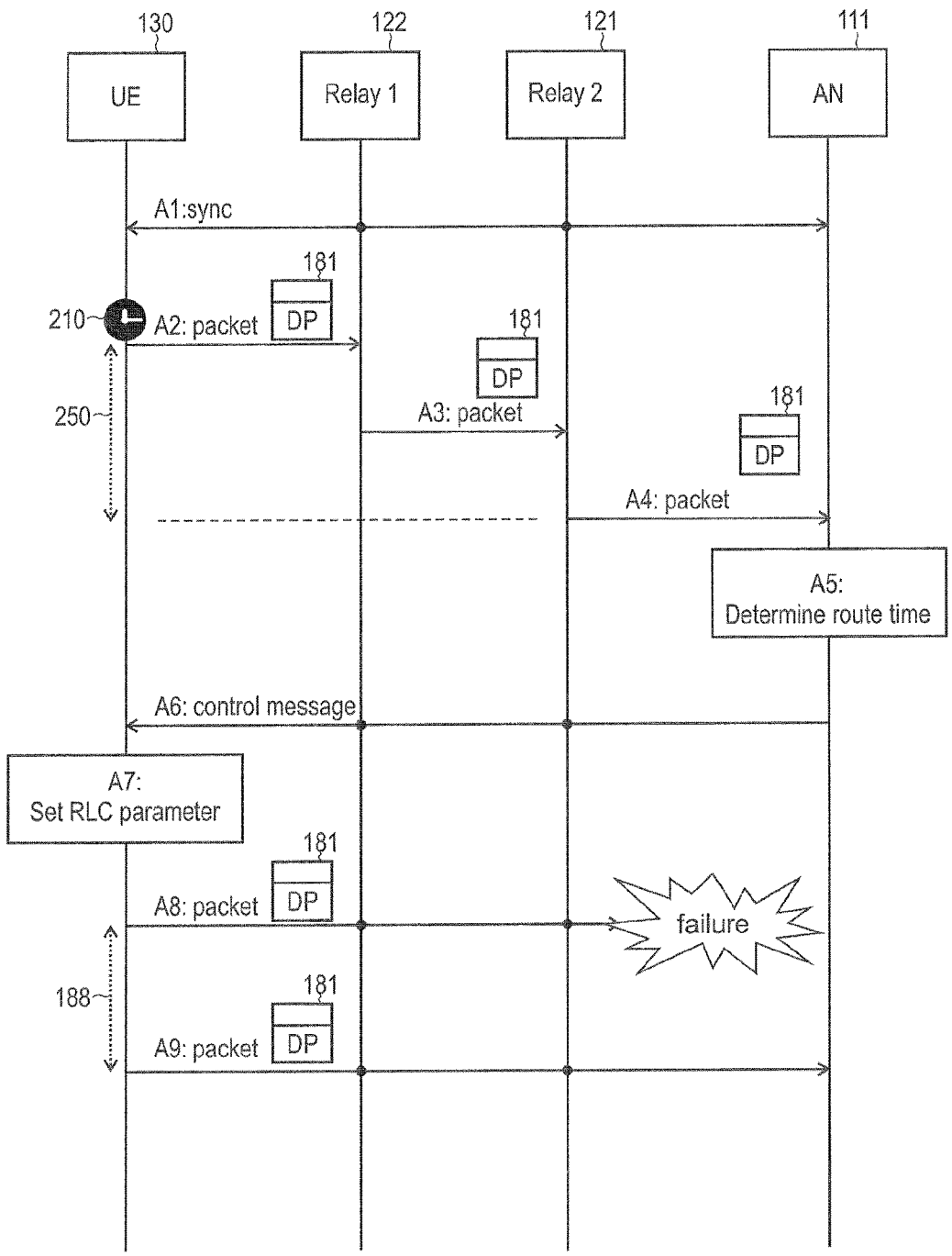
FIG. 2 is a signaling diagram illustrating a control of a setting of a value of a transmission control parameter for the transmission of data on the multi-hop relay radio link according to various embodiments.

Now turning to FIG. 2, a specific scenario relying on of the timing information 210 is illustrated. The exemplary concepts of FIG. 2 are based on the 3GPP LTE radio access technology employing the RLC framework.

At A1, RRC control signaling employing the Physical Downlink Control Channel (PDCCH) and/or the Physical Uplink Control Channel (PUCCH) on the multi-hop relay radio link 190 is exchanged in order to synchronize clocks of the end nodes 111, 130 of the multi-hop relay radio link 190 (for sake of simplicity, in FIG. 2 the hops are not illustrated for A1). I.e., transmission frames of the transmission on the multi-hop relay radio link 190 are synchronized in time domain and according to their numbering. It is noted that the numbering space of the transmission frames does not need to coincide with the sequence number space 185 of the data packets/PDUs 181.

At A2, the data packet 181 is sent from the UE 130 to the relay 122 along the radio front end section of the multi-hop relay radio link 190; the Physical Uplink Shared Channel (PUSCH) is employed.

The data packet 181 includes packetized higher-layer data 180. In alternative implementations, other kinds and types of packets may be employed. E.g., it is possible that a dedicated probing packet is employed in order to determine the route time 250. The dedicated probing packet may not include packetized higher-layer data 180. Alternatively or additionally, a control-signaling packet can be employed. E.g., when employing a control signaling packet and/or the data packet 181 including the higher-layer data 180, the timing information can be piggybacked on top of additional data or information.

The UE 130 includes the timing information 210 in the data packet 181, e.g., in the header section of the data packet 181. In the scenario FIG. 2, the timing information 210 corresponds to a timestamp having a value $S_0$. The value of the timestamp indicates a sending time of the data packet 181 at the UE 130. Generally, the value of the timestamp can encode the sending time of the data packet 181 in various metrics and according to various techniques: e.g., it is possible that the value of the timestamp encodes the sending time by employing a number of the transmission frame of the transmission on the multi-hop relay radio link 190. Alternatively or additionally, it is also possible that the value of the timestamp encodes the sending time of the data packet 181 by employing a different time/date format. In the scenario FIG. 2, because the numbering of transmission frames is synchronized by A1 between the end nodes 111, 130 of the multi-hop relay radio link 190, an advantageous scenario is to indicate the timestamp based on the number of the corresponding transmission frame.

The data packet 181 is then forwarded by the relays 121, 122 towards the access node 111 (A3, A4). In the scenario of FIG. 2, the relays 121, 122 do not modify or add the timing information 210. Eventually, the access node 111 receives the data packet 181 and, based on the timing information 210, determines the unidirectional route time 250 (A5). In the scenario of FIG. 2, the access node 111 can compare a current time S against the value of the timestamp $S_0$. Then, the route time 250 amounts to $S-S_0$.

Next, the access node 111 sends a control message to the UE 130 (A6). The control message indicates the route time 250. Based on the route time 250 as indicated by the control message A6, the UE 130 then sets a RLC transmission control parameter accordingly.

In the scenario FIG. 2, the value of the RLC transmission control parameter set at A7 corresponds to a retransmission timer 188 of the RLC ARQ protocol 182; the retransmission timer controls subsequent transmissions of a further data packet 181 including the higher-layer data 180 via the multi-hop relay radio link 190. As can be seen, the initial attempt (A8) of transmission of the further data packet 181 of the higher-layer data 180 fails; because of this, the UE 130 receives a NACK and/or does not receive an ACK (neither event is shown in FIG. 2). Then, after the retransmission timer 188 has lapsed, the further data packet 181 is retransmitted (A9).

Thus, as can be seen from the above, both the access node 111 and the UE 130 may participate in controlling of the setting of the value of the RLC transmission control parameter; e.g., the access node 111 by determining the route time at A5 and the UE 130 by setting the value of the transmission control parameter accordingly at A7. Yet, according to various scenarios, a different distribution of the logic for controlling the setting of the value of the transmission control parameter is conceivable.

Figure 3:
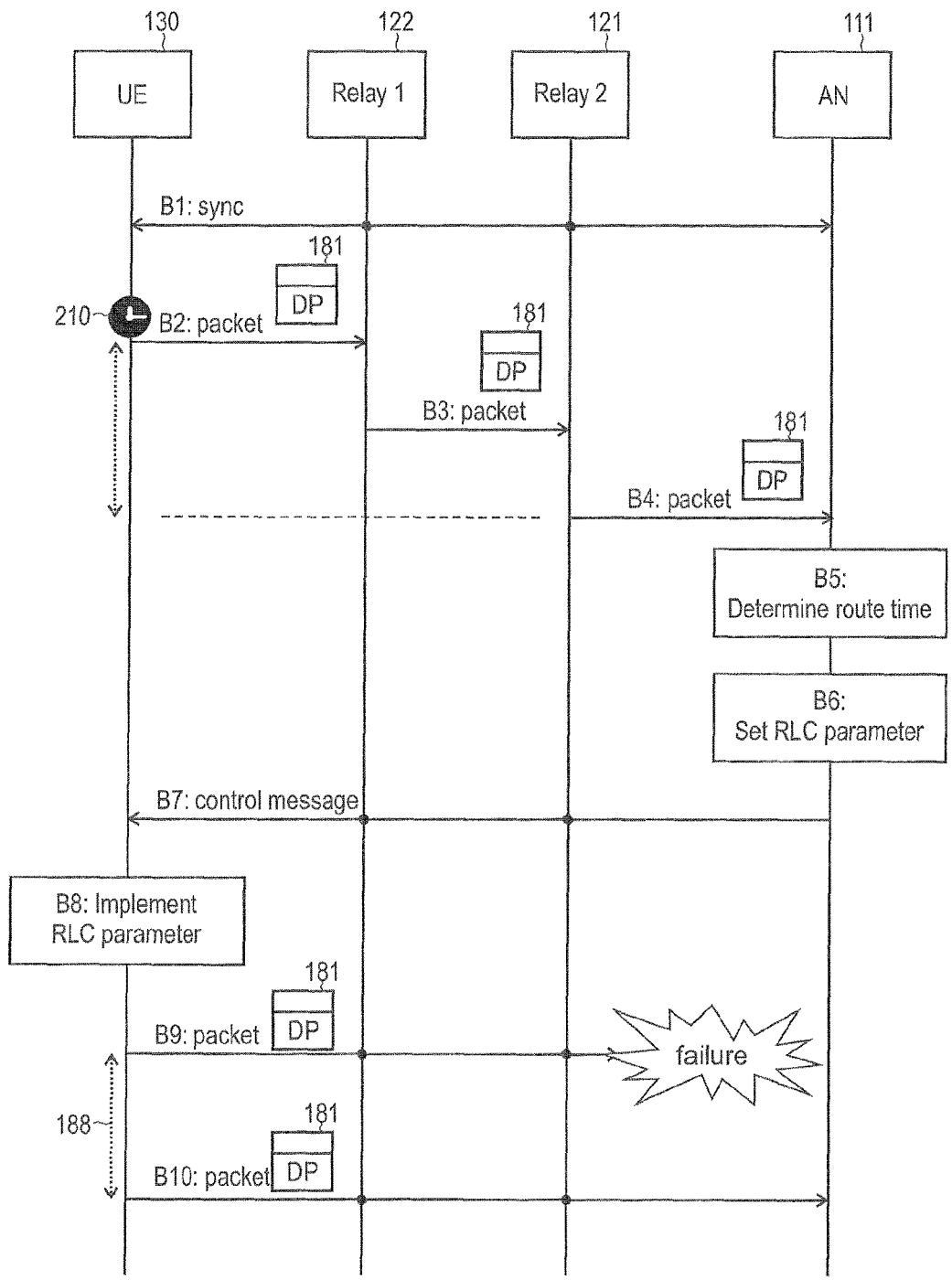
FIG. 3 is a signaling diagram illustrating a control of a setting of a value of a transmission control parameter for the transmission of data on the multi-hop relay radio link according to various embodiments.

With reference to FIG. 3, it is possible that the specific value of the RLC transmission control parameter to be set at the UE 130 is determined by the access node 111. In detail, B1-B5 correspond to A1-A5, respectively. At B6, the access node 111 determines a preset value for the RLC transmission control parameter. The preset value for the RLC transmission control parameter is signaled by means of a control message to the UE 130 (B7). Then, the UE 130 implements the value of the RLC transmission control parameter at B8 as indicated by the control message. Again, B9 and B10 correspond to A8 and A9. In such a scenario, no dedicated logic for determining the value of the transmission control parameter need to be provisioned at the UE 130.

In FIGS. 2 and 3, scenarios have been discussed where the UE 130 applies a new value for the RLC transmission control parameter. Alternatively or additionally, some or all of the relays 121, 122 and/or the access node 111 could implement a new value for the RLC transmission control parameter according to corresponding techniques.

Figure 4:
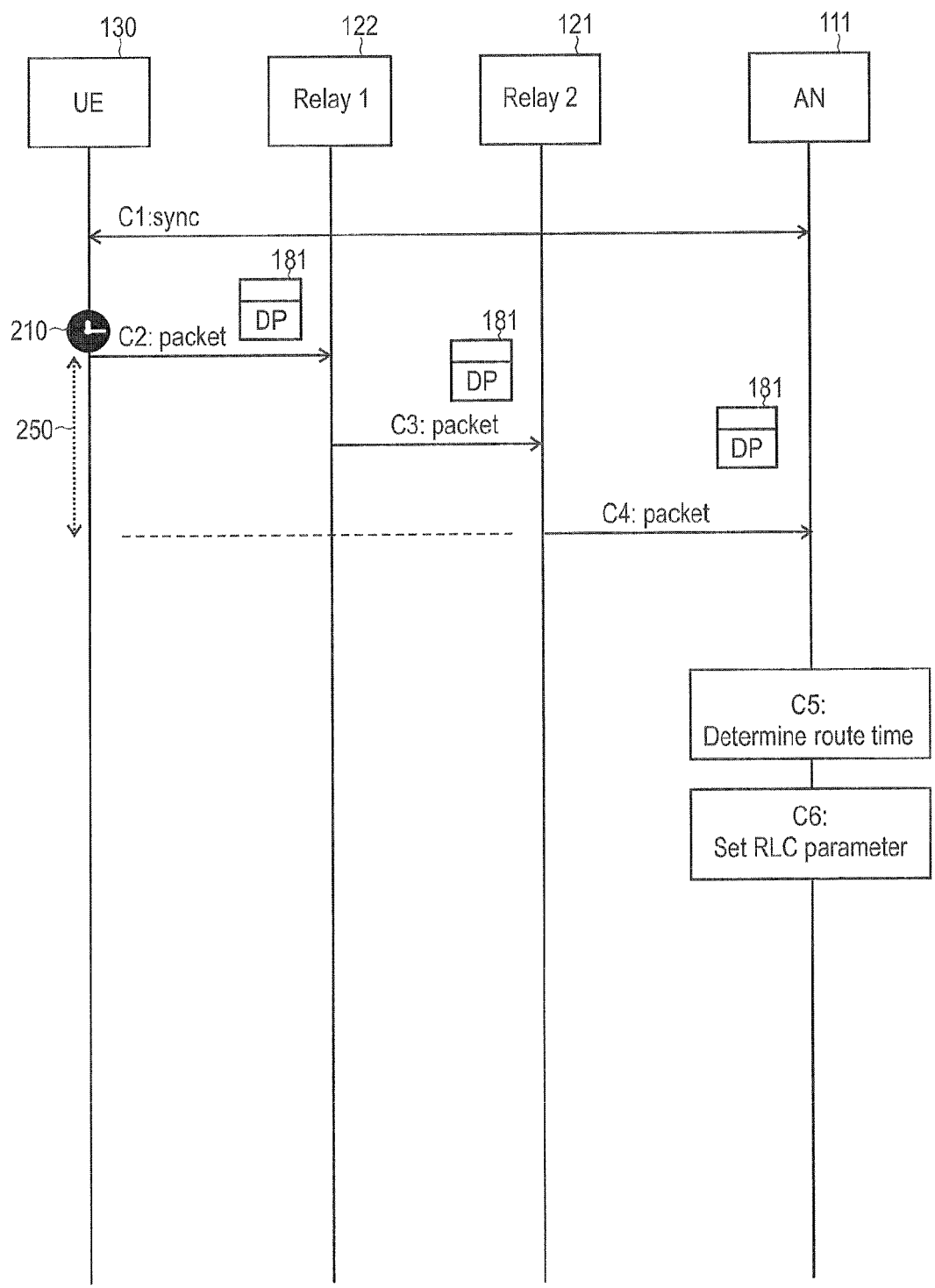
FIG. 4 is a signaling diagram illustrating a control of a setting of a value of the transmission control parameter for the transmission of data on the multi-hop relay radio link according to various embodiments.

With respect to FIG. 4, yet a different distribution of the logic for controlling the setting of the value of the RLC transmission control parameter is illustrated. C1-C5 correspond to A1-A5, respectively. Next, the access node 111 locally sets the value of the RLC transmission control parameter based on the determined route time (C6). In the scenario of FIG. 4, the value of a receiver-specific RLC transmission control parameter is set at C6, e.g., the RLC transmission control parameter "t-StatusProhibit" or other properties of the receive buffer. Because of this, there is no need of involving the UE 130 in said setting of the value of the
RLC transmission control parameter.

With reference to FIGS. 2-4, various scenarios have been explained with respect to UL transmission of the higher-layer data 180. It should be understood that similar techniques may be readily applied with respect to DL transmission of the higher-layer data 180.

Figure 5:
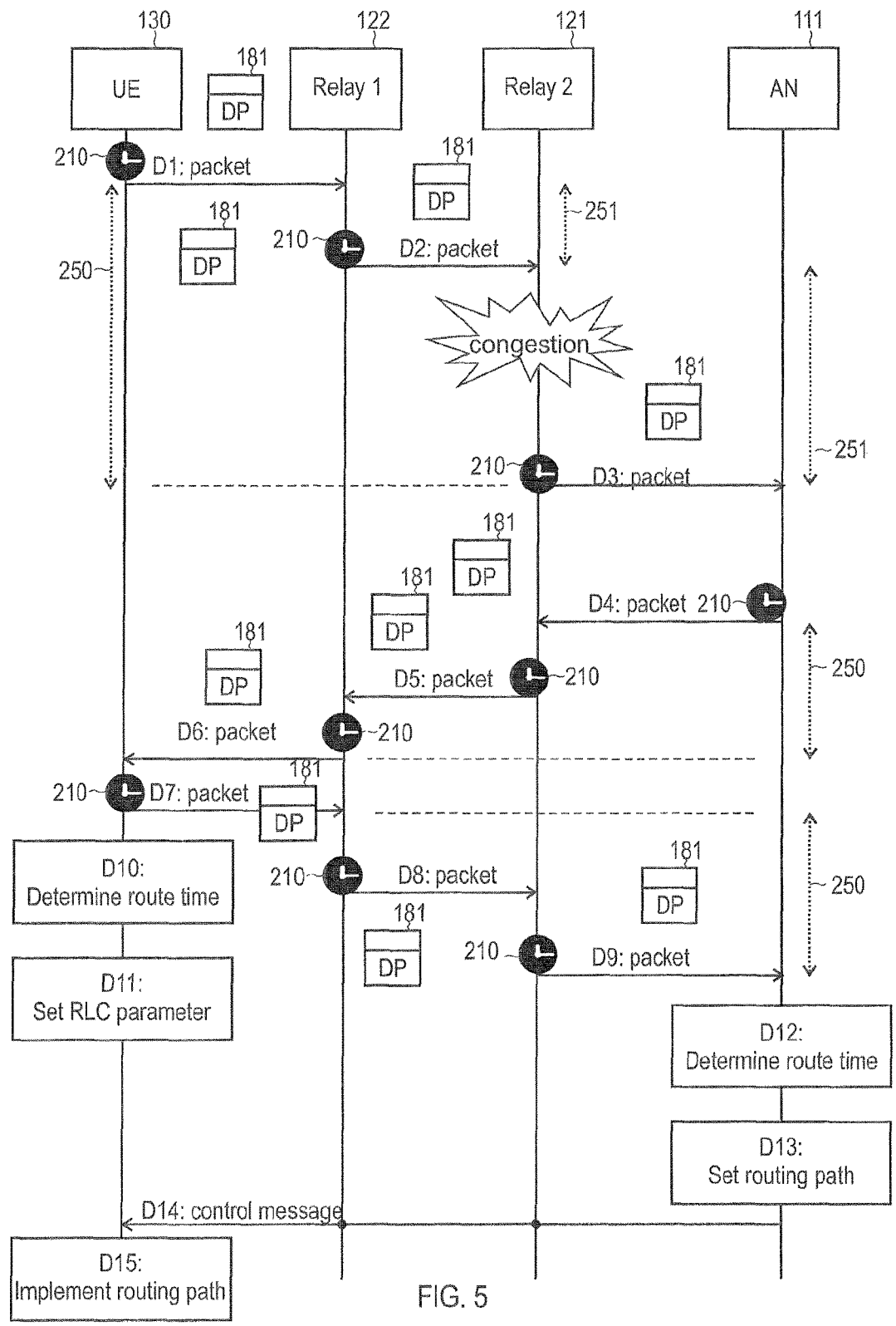
FIG. 5 is a signaling diagram illustrating a control of a setting of the value of the transmission control parameter for the transmission of data on the multi-hop relay radio link according to various embodiments.

In FIG. 5, a scenario is shown where corresponding techniques are applied for both UL transmission and DL transmission of the higher-layer data 180. Further, in the scenario of FIG. 5, no synchronization of the numbering of the transmission frames employed for the transmission on the multi-hop relay radio link 190 between the end nodes 111, 130 of the multi-hop relay radio link 190 exists. Because of this, timing information 210 included in packets 181 transmitted between the end nodes 111, 130 encodes sending times in absolute values independent of the numbering of transmission frames employed for the transmission. It is also possible that synchronization of the numbering of the transmission frames employed for the transmission on the multi-hop relay radio link 190 between the end nodes 111, 130 of the multi-hop relay radio link 190 exists (cf. FIGS. 2-4).

First, the UE 130 sends the data packet 181 and includes timing information 210 in the data packet 181 (D1); said timing information 210 indicates a time of the sending of the data packet 181 by the UE 130 denoted by $S_0$. The relays 122 and 121 forward the data packet 181 (D2, D3) and, respectively, add timing information 210; the timing information 210 is indicative of the time of receiving and/or sending the data packet 181 by the respective relay 121, 122. Eventually, the data packet 181 is received by the access node 111.

Next, the same data packet 181 or a further data packet 181 is sent from the access node 111 to the UE 130 (D4). This returned further data packet 181 may comprise an indication of the initially sent data packet 181 from the UE 130 to the access node 111 so that the respective node or relay, respectively, receiving the returned further data packet 181 may identify this returned further data packet 181 to have be sent in response to the initially sent data packet 181. This indication may be embodied as the time stamp included by the UE 130 or by a dedicated flag. The access node 111 and the forwarding relays 121, 122, in the scenario of FIG. 5, add timing information 210 to the data packet 181, respectively, and forward the data packet 181 (D5, D6). The timing information 210 added by the access node 111 indicates a time of the sending of the data packet 181 by the access node 111 and is denoted $S_1$.

Eventually, the data packet 181 is received by the UE 130. Based on the timing information 210 included in the data packet 181, the UE 130 determines the unidirectional route time 250, e.g., as $(S-S_0)/2$ and/or as $(S_1-S_0)$, and sets the RIC transmission control parameter accordingly (D11).

Furthermore, based on the timing information 210, the UE 130 can determine the hop time 251 between any two nodes 111, 121, 122, 130 of the multi-hop relay radio link 190 on a per-link basis; e.g., the UE 130 can determine the hop time in between the UE 130 and the relay 122 and/or the hop time between the relay 122 and the relay 121, and so forth. E.g., the UE 130 can determine the hop time 251 between neighboring nodes 111, 121, 122, 133 of the multi-hop relay radio link 190. The hop time 251 may be taken into account when determining the route time 250, e.g., by summing up the hop times 251 along all links of the multi-hop relay radio link 190. Alternatively or additionally, the hop time 251 may be taken into account when determining the RIC transmission control parameter at one or more of the relays 121, 122. Alternatively or additionally, the hop time 251 may be taken into account when taking a routing decision. As can be seen, by including the timing information 210 at every hop along the multi-hop relay radio link 190, it is possible to derive more information on the route time 250.

Optionally, the UE 130 can determine the bidirectional round trip time $S-S_0$ from the UE 130 to the access node 111 and back.

Optionally, the clock offset of the clocks of the UE 130 and the access node 111 can be determined. The clocks may be responsible for the numbering of transmission frames.

Consider as an example $S_0=391$, $S_1=117$, $S=399$ (arbitrary units such as milliseconds or number of transmission frames). This implies that the bidirectional round trip time is estimated as $S-S_0=399-91=8$, the unidirectional route time as $(S-S_0)/2=4$ and that the clock offset between the clocks can be estimated as $S_1-S_0-(S-S_0)/2=117-391-4=-278$, i.e., that is the clock in the access node 111 is behind the clock in the UE 130.

As can be seen from FIG. 5, the UE 130 returns the data packet 181 (D7-D9) and adds timing information 210 indicative of the sending time of the respective data packet 181 and denoted $S_2$. It is noted that the UE 130 does not need to return the same data packet 181, but could return a different data packet 181. Again, timing information 210 is added by the relays 121, 122. Then, the AN 111 determines the unidirectional route time 250, e.g., as $(S_1-S_0)/2+(S-S_2)/2$, i.e., by taking into account multiple transmissions of data packets 181 (D12).

Passing multiple packets 181 including such timing information 210 along the route path of the multi-hop relay radio link 190 improves an accuracy of the estimate of the route time 250. E.g., the route time 250 can be determined further based on a further route time of the further data packet 181 transmitted between the end nodes 111, 130 prior to the transmission of the data packet 181. As discussed above, it is possible that certain links or nodes 111, 121, 122, 130 require longer time for transmission of the data packet 181 than others; in some scenarios, such a delay may be systematic and fixed. However, sometimes it is also possible that delays in the transmission of the data packet 181 occur sporadic and/or statistically distributed. In particular, in such cases it may be beneficial to also take into account timing information 210 of a plurality of packets 181 sequentially transmitted on the multi-hop relay radio link 190. A reliability of singular measures of the route time 250 can be verified. In other words, it may be desirable to take into account previous measurements of the route time 250 when determining a current route time 250. E.g., weighted filtering may be applied to these previously determined values; said weighted filtering may be implemented by differently weighting the obtained route times used for determining the route time based on which the controlling is performed.

Sometimes, it may not be possible or only possible to a limited degree to take into account previously sent packets 181. In some embodiments, a margin or offset compensation may be considered when determining the route time 250. E.g., the margin may be in the order of 10 of the determined route time 250. This may allow to appropriately reflect measurements errors, channel variations, load variations etc.

As can be seen from FIG. 5, it is possible that the hop time 251 along a single link of the multi-hop relay radio link 190 is prolonged due to, e.g., congestion of the corresponding relay 121. Then, the route time 250 may not scale linearly with the number of hops. In such a case, it may be preferable to include the above-mentioned timestamp. This allows to appropriately measure any individual delays along certain links of the multi-hop relay radio link 190. In particular, the delay characteristics of the various hops of the multi-hop relay radio link 190 can be derived. However, sometimes an assumption of a linearly scaling route time 250 may be a good approximation. Then, employing timestamps may be comparably complex and a good approximation of the route time 250 may be achieved by incrementing a counter: E.g., it is possible that the route time scales linearly with the number of hops; in such a scenario, a good approximation may be achieved by timing information 210 which comprises a number of hops of the data packet 181 along the multi-hop relay radio link 190. Then, the route time 250 between the end nodes 111, 130 can be based on a number of hops and a predefined hop time. In other words, it is possible that the timing information 210 corresponds to a counter which is incremented in each relay 121, 122; thereby, the end nodes 111, 130 receive knowledge about the number of hops that the data packet 181 has passed along. The predefined hop time may be determined alike for all links of the multi-hop relay radio link 190; it is also possible that the predefined hop time is set differently for the different links of the multi-hop replay radio link 190.

Hence, in order to determine the end-to-end route time 250, the following equation can be executed:

$$T(N)=T1 \times N,$$

where T1 is the predefined hop time and N is the number of hops as indicated by the timing information 210. It is also possible that the route time 250 is set by a function or table such that $T(N)=TN$ such that $T1 \leq T2 \leq T3 \ldots$ Still referring to FIG. 5, the access node 111 determines the value of the transmission control parameter, specifically selects an appropriate route path through a cellular network 100 having multi-path topology (D13). The access node 111 signals the preset value of the transmission control parameter to the UE 130 (D14) which subsequently implements the preset value of the transmission control parameter (D15).

Thus, based on the route time 250, a routing decision may be taken. The routing decision may result in selecting a route path from a plurality of candidate route paths. Above, various scenarios have been discussed with respect to RIC transmission control parameters and other specific examples of transmission control parameters; similar scenarios may be applied to other kinds and types of transmission control parameters.

Figure 6:
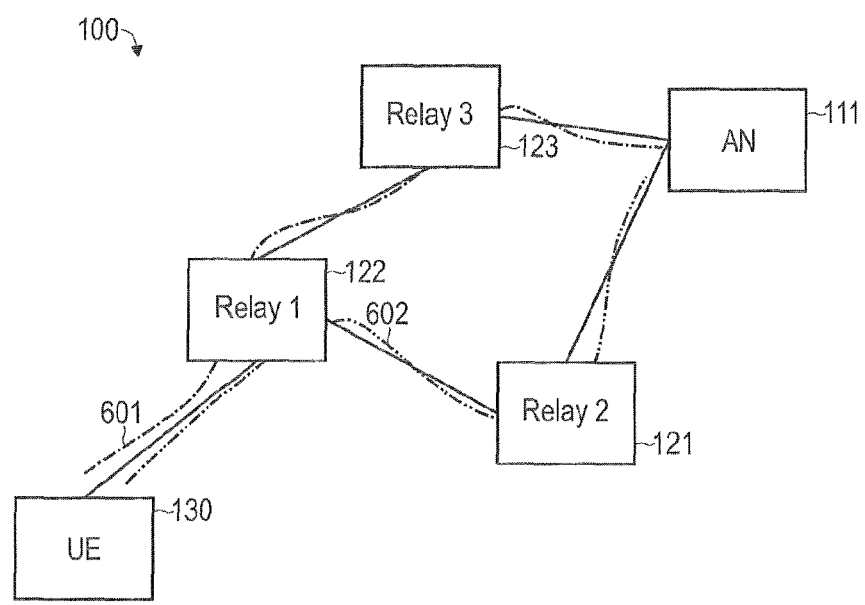
FIG. 6 schematically illustrates different route paths of a multi-hop relay radio link having a multi-path topology.

Further, techniques of controlling the setting of the value of the transmission control parameter have been primarily discussed above with respect to the cellular network 100 having a linear topology. Similar scenarios also apply to a cellular network 100 where a plurality of route paths 601, 602 along relays 121, 122, 123 between the end nodes 111, 130 are available (multi-path topology), cf. FIG. 6. Sometimes, the multi-path topology is also referred to as a mesh geometry. In a multipath topology, typically the given relay node 121-123 has more than one direct communication peers. In such a scenario of a multi-path topology, it is possible to add the timing information 210 by each node of the multi-hop relay radio link 190 (cf. FIG. 5). Then, the available timing information 210 allows to determine the route time 250 per each route path 601, 602 taken, e.g., on a per-link basis. Here, the corresponding hop times 251 may be taken into account. Alternatively or additionally, it is also possible to select the route path 601, 602 from a plurality of candidate route paths 601, 602 depending on the timing information 210. In other words, it is possible that the transmission control parameter relates to the route path 601, 602. E.g., the route path 601, 602 can be determined such that it is the route path having the lowest number of hops, and/or providing the lowest route time 250, etc. In other words, the set value of the transmission control parameter may correspond to an identification of the determined route paths.

Figure 7:
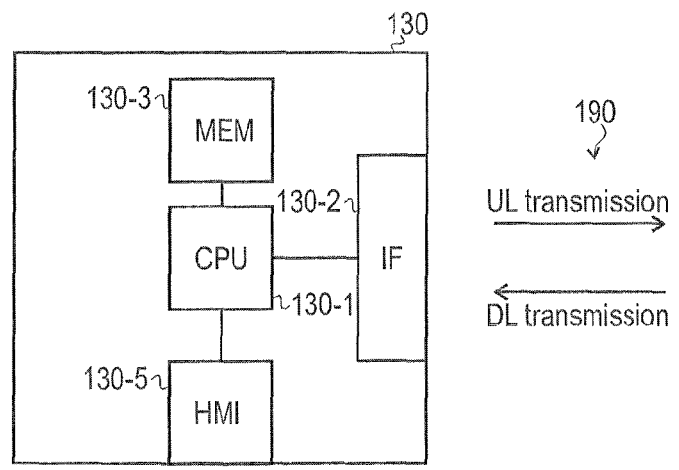
FIG. 7 schematically illustrates a communication device according to various embodiments.

In FIG. 7, the UE 130 is schematically illustrated. The UE comprises a processor 130-1 which may be configured for shared computing and/or distributed processing. E.g., the processor 130-1 can be a multi-core processor. Further, the UE 130 comprises an interface 130-2. The processor 130-1 can send and/or receive packets on the multi-hop relay radio link 190 via the interface 130-2. Further, the UE 130 comprises an optional a human machine interface (HMI) 130-5. Via the HMI 130-5, the processor 130-1 can output information to a user and/or input information from a user. Further, the UE 130 comprises a memory 130-3, e.g., a non-volatile memory. The memory 130-3 can store program code, wherein execution of the program code causes the processor 130-1 to execute techniques according to various embodiments as explained herein; e.g., execution of the program code can cause the processor 130-12 control the setting of the value of the transmission control parameter 185-188 and/or set the value of the transmission control parameter 185-188 and/or determine the route time 250 and/or send the data packet 181 and/or receive the data packet 181 and/or add timing information to the data packet 181.

Figure 8:
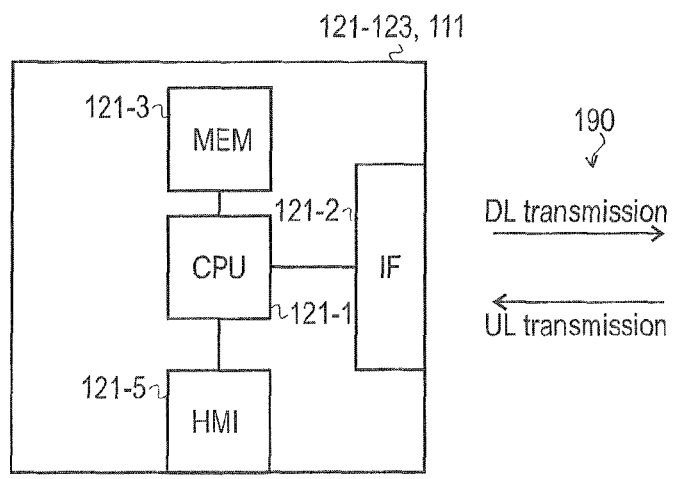
FIG. 8 schematically illustrates an access node of a cellular network according to various embodiments.

In FIG. 8, the access node 111 and the relays 121-123 are schematically illustrated. Generally, it is possible that the relay functionality of the relays 121-123 is implemented by a mobile device such as a UE. The device 111, 121-123 comprises a processor 121-1 which may be configured for shared computing and/or distributed processing. E.g., the processor 121-1 can be a multicore processor. Further, the device 111, 121-123 comprises an interface 121-2. The processor 121-1 can transmit packets on the multi-hop relay radio link 190 via the interface 121-2. Further, the device 111, 121-123 comprises an optional HMI 121-5. Via the HMI 121-5, the processor 121-1 can output information to a user and/or input information from a user. Further, the device 111, 121-123 comprises a memory 121-3, e.g., a non-volatile memory. The memory 121-3 can store program code, wherein execution of the program code causes the processor 130-1 to execute techniques according to various embodiments as explained herein; e.g., execution of the program code can cause the processor 121-1 to control the setting of the value of the transmission control parameter 185-188 and/or set the value of the transmission control parameter 185-188 and/or determine the route time 250 and/or send the data packet 181 and/or receive the data packet 181 and/or add timing information 210 to the data packet 181.

Figure 9:
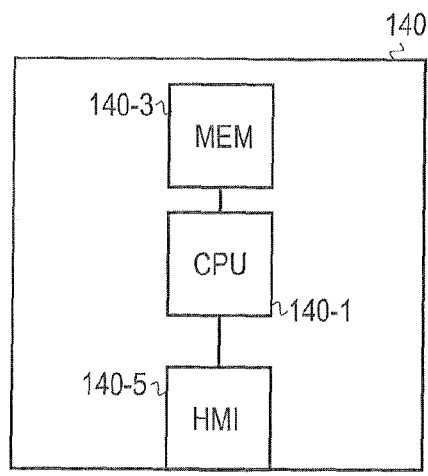
FIG. 9 schematically illustrates an network node of a core network of a cellular network according to various embodiments.

In FIG. 9, a network node 140 of the core network is schematically illustrated. The network node 140 comprises a processor 140-1 which may be configured for shared computing and/or distributed processing. E.g., the processor 140-1 can be a multicore processor. Further, the network node 140 comprises an optional HMI 140-5. Via the HMI 140-5, the processor 140-1 can output information to a user and/or input information from a user. Further, the network node 140 comprises a memory 140-3, e.g., a non-volatile memory. The memory 140-3 can store program code, wherein execution of the program code causes the processor 140-1 to execute techniques according to various embodiments as explained herein; e.g., execution of the program code can cause the processor 140-1 to control the setting of the value of the transmission control parameter 185-188 and/or determine the route time 250.

Figure 10:
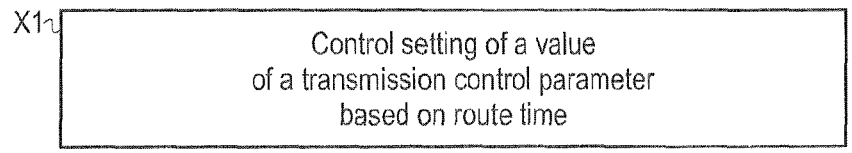
FIG. 10 is a flowchart of a method according to various embodiments.

In FIG. 10, a flowchart of a method according to various embodiments is shown. E.g., execution of the program code stored in one of the memories 121-3, 130-3, 140-3 can cause the respective processor 121-1, 130-1, 140-1 to execute the method according to FIG. 10.

At X1, the setting of the value of the transmission control parameter 185-188 is controlled. The control occurs based on the route time 250 of a packet along the multi-hop relay radio link 190. E.g., the route time 250 may be obtained from a control message previously received. It is also possible that the method further comprises determining the route time 250.

Controlling the setting of the value of the transmission control parameter 185-188 can include the setting of the value of the transmission control parameter 185-188, e.g., by the respective processor 121-1, 130-1 of the corresponding nodes 111, 121-123, 130 of the multi-hop relay radio link 190. Alternatively or additionally, it is can also include sending a control message indicating a preset value of the transmission control parameter 185-188 and prompting a further node 111, 121-123, 130 of the multi-hop relay radio link 190 to correspondingly set the value of the transmission control parameter.

Generally, various trigger criterions for execution of X1 can exist. E.g., the setting of the value of the transmission control parameter 185-188 can be executed in response to a change of the topology of the nodes 111, 121-123, 130 of the multi-hop relay radio link 190.

Alternatively or additionally, it is also possible that X1 is executed in response to a change in a load level or congestion level of a node 111, 121-123, 130 of the multi-hop relay radio link 190. Control signaling may be employed to monitor and detect such changes; here, a mechanism overlaid on top of the network operation, e.g., residing in a control plane of the network 100, may be employed. Alternatively or additionally, it is also possible that nodes which are added/removed and/or which experience a change in the load level, etc., proactively signal such a change of their operating condition. E.g., if respective RRC control signaling indicates that a load level of a corresponding node 111, 121-123, 130 crosses a predefined threshold, X1 can be executed. Alternatively or additionally, it is possible that X1 is executed in response to a reconfiguration timer timeout. E.g., X1 can be executed at a fixed frequency of occurrence or at a given periodicity. By this, it can be ensured that the transmission control parameter 185-188 is kept up-to-date.

Figure 11:
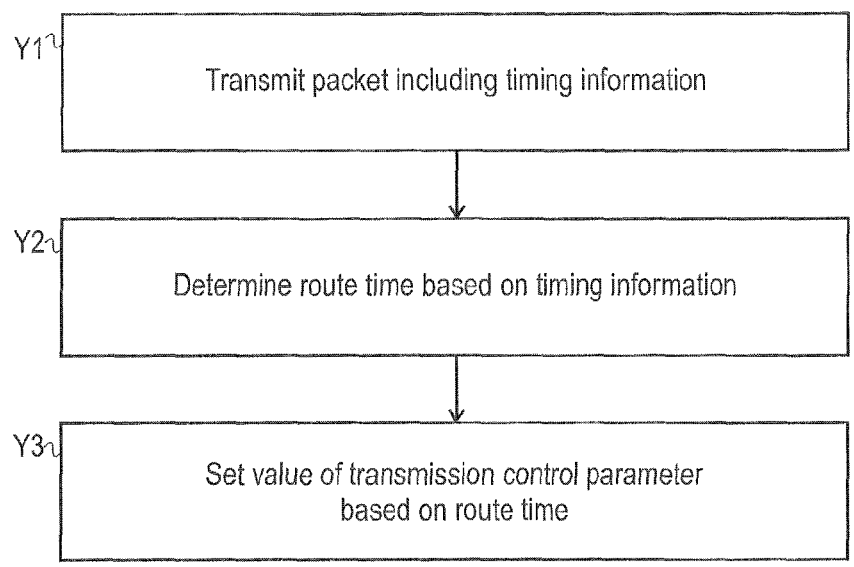
FIG. 11 is a flowchart of a method according to various embodiments.

In FIG. 11, a flowchart of a method according to various embodiments is shown. At Y1, the packet including the timing information 210 is transmitted between the end nodes 111, 130 of the multi-hop relay radio link 190. This includes a source end node 111, 130 sending the packet and a target node 111, 130 receiving the packet. Intermediate relays 121-123 forward the packet along its route path 601, 602. The source node 111, 130 adds the timing information 210 to the packet; optionally, one or more of the intermediate relays 121-123 include the timing information 210.

Generally, the timing information 210 can take various forms in various metrics. E.g., the timing information 210 can correspond to a timestamp indicative of the sending time, e.g., in an arbitrary units or in terms of a number of the corresponding transmission frame used as a metric. Alternatively or additionally, it is also possible that the timing information 210 corresponds to a counter which is incremented by each hop along the route path 601, 602 taken by the packet.

The packet for which the route time is monitored may be a dedicated probing packet; alternatively or additionally, it is also possible to piggyback the timing information 210 on a control signaling packet and/or a data packet 181 also including the higher-layer data 180.

Then, the route time 250 is determined based on the timing information 210 at Y2. The route time 250 corresponds to the aggregate unidirectional route time 250 between the end nodes 111, 130; additionally, the hop time 251 between intermediate nodes 111, 121-123, 130 can be determined.

At Y3, the value of the transmission control parameter 185-188 is set based on the determined route time 250, and optionally based on the hop time 251. Generally, various qualitative and quantitative dependencies of the transmission control parameter 185-188 on the determined route time 250 are conceivable.

Summarizing, techniques have been discussed above which enable the setting of the values of transmission control parameters including ARQ protocol properties, timer values, and routing paths. Said setting is based on a route time of a packet along a multi-hop relay radio link; timing information can be added to the packet. The timing information enables to construct an end-to-end route time estimate.

Thus, determining of the route time in a multi-hop, relay-based network has been demonstrated. The configuration of transmission control parameters of a transmission protocol according to the determined route time has been explained. There are different kinds of transmission control parameters that may be configured including, but not limited to: timers directly impacted by route time and further transmission control parameters indirectly impacted by route time. The kind of the estimation of the route time may depend on the underlying network, e.g., if synchronization between different nodes is present and/or if a multi-path network topology is present. The route time may be a measure of single path length. Different trigger criterions for triggering the determining of the route time and/or said controlling of the setting of the value of the transmission control parameter have been illustrated. It has been demonstrated how older estimations may be utilized with appropriate filtering. It has been shown that a specific transmission control parameter influences routing decisions taken in a multi-path network.

Such techniques enable to accurately set the value of the transmission control parameter taking into account transmission characteristics of the overall multi-hop relay radio link and possibly of individual links of the multi-hop relay radio link. Further, by piggybacking the timing information on, e.g., data packets also including higher-layer data, additional control signaling can be avoided. Sporadic delays can be detected by monitoring the route time at a suitable frequency of occurrence; specific trigger criterions can be implemented alternatively or additionally to avoid using an outdated transmission control parameter: e.g., a change in the topology of the cellular network and/or a change in the load level may be monitored and used as the trigger criterion. Statistical variations in the route time can be addressed by taking into consideration timing information of a plurality of packets transmitted on the multi-hop relay radio link and by, e.g., executing statistics on thus obtained distribution of route times. Where the hop time is determined on a per-link basis, routing decisions including routing path selection can be facilitated. Sometimes, the timing information can correspond to a timestamp; this allows to accurately determine route time even if not all participating nodes have synchronized their numbers of transmission frames. The timing information can also correspond to a counter which is incremented by each hop along the multi-hop relay radio link; here, a straightforward and lean approximation of the route time becomes possible. Depending on load sharing aspects, logic for the control of the setting of the value of the transmission control parameter may be distributed flexibly in-between different end nodes of the multi-hop relay radio link or other network nodes of the cellular network including relays.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A device, comprising:
at least one processor configured to control setting of a value of a transmission control parameter for a transmission of data on a multi-hop relay radio link of a cellular network, said controlling being based on a route time of a packet transmitted between end nodes of the multi-hop relay radio link,
wherein the multi-hop relay radio link comprises a plurality of links between neighboring nodes and extends between the respective end nodes of the multi-hop relay radio link,
wherein the transmission control parameter relates to a property of an Automatic Repeat Request protocol employed by the end nodes to protect the transmission of the data on the multi-hop relay radio link,
wherein the property of the Automatic Repeat Request protocol is selected from a group comprising: a size of a transmission window and a size of a sequence number space, and wherein same values for the size of the sequence number space and the size of the transmission window, are reused for the nodes of the multi-hop relay radio link.

2. A method, comprising:
controlling a setting of a value of a transmission control parameter for a transmission of data on a multi-hop relay radio link of a cellular network based on a route time of a packet transmitted between end nodes of the multi-hop relay radio link,
wherein the multi-hop relay radio link comprises a plurality of links between neighboring nodes and extends between the respective end nodes of the multi-hop relay radio link, wherein the transmission control parameter relates to a property of an Automatic Repeat Request protocol employed by the end nodes to protect the transmission of the data on the multi-hop relay radio link,
wherein the property of the Automatic Repeat Request protocol is selected from a group comprising: a size of a transmission window and a size of a sequence number space, and wherein same values for the size of the sequence number space and the size of the transmission window, are reused for the nodes of the multi-hop relay radio link.

3. The method of claim 2,
wherein the group further comprises: a maximum number of retransmission attempts of a given data packet of the data; a property of an acknowledgement request; a timeout duration for transmitting the acknowledgement request; a timeout duration for reordering sequence numbers of received data packets; a number of packets acknowledged by a status report; and a timeout duration for retransmitting a status message.

4. The method of claim 2,
wherein the transmission control parameter further relates to a property of packetizing higher-layer packets by a source node of the end nodes to provide the data transmitted on the multi-hop relay radio link.

5. The method of claim 2,
wherein the multi-hop relay radio link has a multi-path topology,
wherein the transmission control parameter further relates to a route path of the transmission of the data through the multi-hop relay radio link having the multi-path topology, and
wherein the method further comprises:
based on the route time of the packet taking a routing decision of the route path of the transmission of the data through the multi-hop relay radio link having the multi-path topology.

6. The method of claim 2, further comprising:
determining the route time based on timing information included in the packet and
sending and/or receiving the packet including the timing information on the multi-hop relay radio link,
wherein the packet is selected from a group comprising: a control-signalling packet; a data packet of the data; and a probing packet.

7. The method of claim 6,
wherein the timing information comprises a number of hops of the packet along the multi-hop relay radio link, and
wherein said determining of the route time is based on the number of hops and a predefined hop time.

8. The method of claim 6,
wherein the timing information comprises a time stamp indicating a send time of the packet at a source node of the end nodes, and
wherein said determining of the route time is based on a current time and the send time.

9. The method of claim 6,
wherein the timing information comprises at least one further timestamp indicating a send time of the packet at least one intermediate relay node of the multi-hop relay radio link, and
wherein the method further comprises:
determining at least one hop time between the nodes of the multi-hop relay radio link based on the at least one further timestamp.

10. The method of claim 9,
wherein the setting of the value of the transmission control parameter at the at least one intermediate relay node is controlled further based on the at least one hop time.

11. The method of claim 2, further comprising:
determining the route time based on a route time of a further packet transmitted between the end nodes prior to the transmission of the packet.

12. The method of claim 2, further comprising:
receiving a control message indicating the route time.

13. The method of claim 2,
wherein said controlling of the setting of the value of the transmission control parameter is in response to a change in a topology of the nodes of the multi-hop relay radio link and/or in response to a change in a load level of a node of the multi-hop relay radio link and/or is in response to a reconfiguration timer timeout.

14. The method of claim 2,
wherein said controlling of the setting of the value of the transmission control parameter comprises:
sending a control message causing at least one of the end nodes to set the value of the transmission control parameter.

15. The method of claim 2,
wherein the method is executed by a network node of the cellular network or
wherein the method is executed by a communication device attachable to the cellular network via the multi-hop relay radio link.

16. A computer program product comprising a non-transitory computer readable medium comprising program code, wherein execution of the program code by at least one processor causes the at least one processor to execute a method comprising:
controlling a setting of a value of a transmission control parameter for a transmission of data on a multi-hop relay radio link of a cellular network based on a route time of a packet transmitted between end nodes of the multi-hop relay radio link,
wherein the multi-hop relay radio link comprises a plurality of links between neighboring nodes and extends between the respective end nodes of the multi-hop relay radio link,
wherein the transmission control parameter relates to a property of an Automatic Repeat Request protocol employed by the end nodes to protect the transmission of the data on the multi-hop relay radio link,
wherein the property of the Automatic Repeat Request protocol is selected from a group comprising: a size of a transmission window and a size of a sequence number space, and wherein same values for the size of the sequence number space and the size of the transmission window, are reused for the nodes of the multi-hop relay radio link.

* * * * *